United States Patent [19]
Pfister

[11] Patent Number: 5,681,093
[45] Date of Patent: Oct. 28, 1997

[54] DOUBLE-SHELL SUPPORTING DEVICE FOR A BACK REST OF A SEAT-GROUP STRUCTURE

[75] Inventor: Hans Pfister, Lenzburg, Switzerland

[73] Assignee: Symalit AG, Lenzburg, Switzerland

[21] Appl. No.: 702,461

[22] PCT Filed: Mar. 22, 1995

[86] PCT No.: PCT/CH95/00064

§ 371 Date: Jan. 3, 1997

§ 102(e) Date: Jan. 3, 1997

[87] PCT Pub. No.: WO95/26663

PCT Pub. Date: Oct. 12, 1995

[30] Foreign Application Priority Data

Mar. 30, 1994 [CH] Switzerland .................. 960/94

[51] Int. Cl.⁶ .................................................. A47C 5/12
[52] U.S. Cl. .................. 297/452.65; 297/452.55; 403/335
[58] Field of Search .................. 297/452.14, 452.18, 297/452.55, 452.65; 403/326, 327, 329, 335

[56] References Cited

U.S. PATENT DOCUMENTS

| 3,482,874 | 12/1969 | Henebry et al. | 297/452.65 |
|---|---|---|---|
| 3,992,056 | 11/1976 | Koziatek et al. | 297/250.1 |
| 4,088,367 | 5/1978 | Atkinson et al. | 297/452.65 X |
| 4,813,808 | 3/1989 | Gehrke | 403/326 |
| 5,013,179 | 5/1991 | Rothmund | 403/335 |

FOREIGN PATENT DOCUMENTS

| 0 278 919 A2 | 8/1988 | European Pat. Off. . |
|---|---|---|
| 0 373 024 A1 | 6/1990 | European Pat. Off. . |
| 0 386 395 A1 | 9/1990 | European Pat. Off. . |
| 2 655 306 A1 | 6/1991 | France . |
| 31 36 651 A1 | 3/1983 | Germany . |
| 37 34232 C1 | 1/1989 | Germany . |
| 1136863 A | 1/1985 | U.S.S.R. . |

*Primary Examiner*—Peter R. Brown
*Attorney, Agent, or Firm*—Marshall, O'Toole, Gerstein, Murray & Borun

[57] ABSTRACT

The present invention provides a double shell supporting device of a plastic material for a backrest of a seat-group structure with an inner shell part adapted to be a support of the back of a person sitting on the corresponding seat and an outer shell part which functions as a stiffening member.

8 Claims, 1 Drawing Sheet

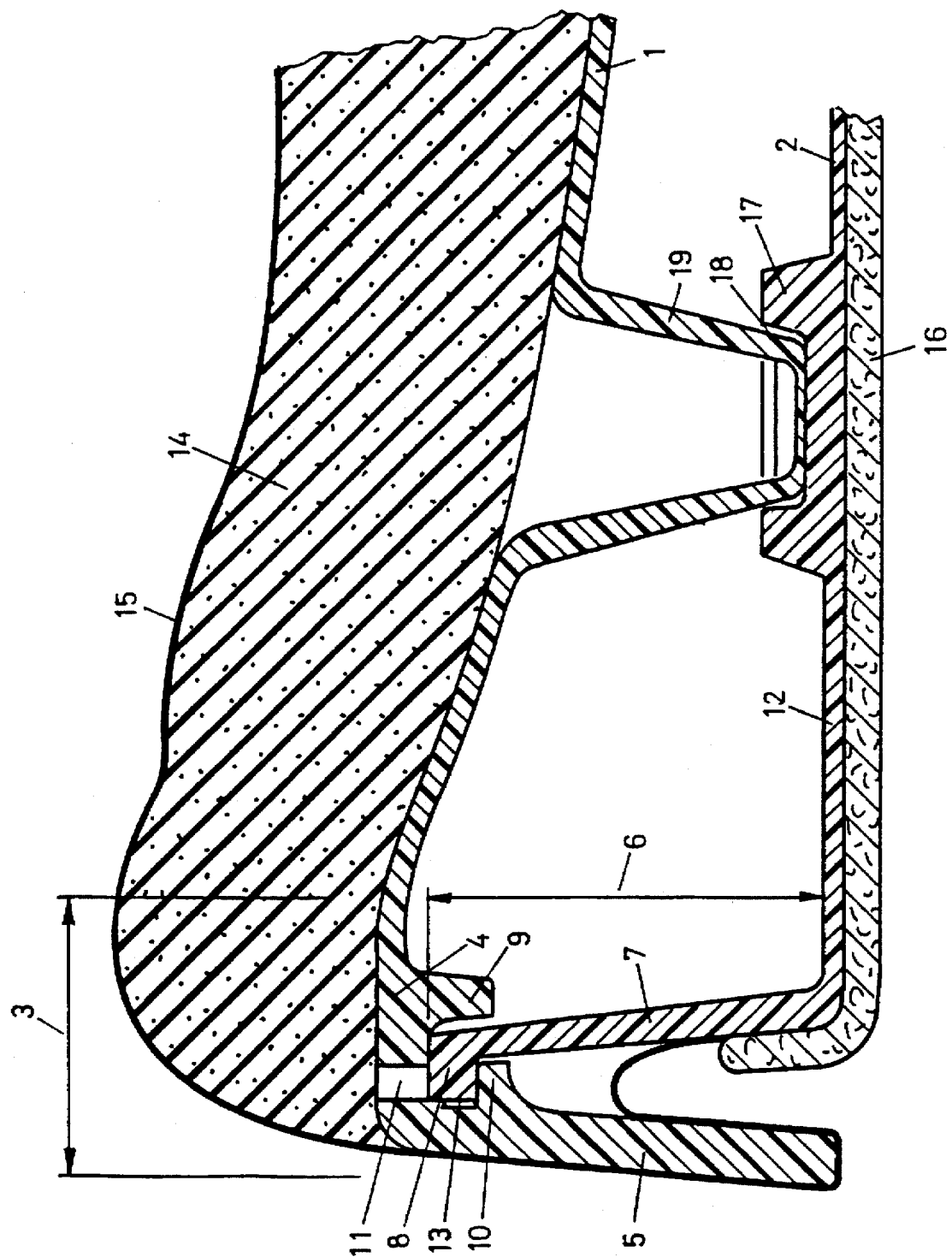

DOUBLE-SHELL SUPPORTING DEVICE FOR A BACK REST OF A SEAT-GROUP STRUCTURE

BACKGROUND OF THE INVENTION

The present invention relates to a double shell supporting device of a plastic material for a back rest of a seat-group structure with an inner shell part adapted to be a, support of the back of a person sitting on the corresponding seat and an outer shell part destined to be a stiffening member.

Backrests of seat-group structures include generally a supporting device which can be designed as a plate or a frame. This plate or this frame, resp. can serve in case of simpler designs, e.g. garden chairs, for a direct contacting the back of the seated person, or can be, in case of e.g. upholstered chairs or seats of motor vehicles with a upholster, connected to a upholstering. The supporting device which can be made, as generally known, of metal or plastic material can include, furthermore, a cladding on the reverse side which may be merely a lacquer or also a decorative covering, for instance a textile product, or piece of a carpet, leather, etc. For back rest seats single-shell, ribbed supporting devices have become known which indeed may be manufactured at low costs, can, however, not meet the steadily increasing demands made for such group structures. Furthermore, shell parts made of two pressed parts of glass mat reinforced thermoplastic plastic material laminates welded afterwards together have become known as supporting structures. The two shell parts are, thereby, welded together along the edge areas which extend along both sides of the back rest and along its upper edge. While a supporting device which is formed of two shell parts which are welded together can absorb large forces without damage and in case of motor vehicles can also meet the higher demands in case of an accident, the production by means of a welding is costly and time consuming.

SUMMARY OF THE INVENTION

Object of the invention is to remedy the mentional drawbacks and to provide a double shell supporting device which is designed in a low cost manner and for a saving on assembly time.

The inventive double shell supporting device of the invention comprises plastic material for a backrest of a seat group structure with an inner shell part destined as a backrest for a person sitting on the corresponding seat, and an outer shell part acting as a stiffening member. The supporting device is further characterized in that the outer shell part is clampingly connected to the inner shell part by means of a form-locked snap-lock connection. The inner shell part includes a circumferential L-shaped portion which includes a first leg part and a second leg part. The outer shell part includes a circumferential L-shaped portion. In includes a third leg part and a fourth leg part. A first protrusion part projects from the first leg part. A second protrusion part projects from the second leg part. These two protrusion parts define a gap into which the fourth leg part of the L-shaped portion is set in a clamped manner. In order to assemble to snap-lock connection, the second leg part and the third leg art can be bent in a resilient manner. Thus, the fourth leg part is held form-locked in the L-shaped portion due to the elasticity of the glass-mat reinforced thermoplastic material laminate of which the inner shell part and the outer shell part are made. Therefore, no separation of the inner shell part can occur in case of an influence of forces. The assembling of the two shell arts is extremely simple, of low cost and needs little time.

BRIEF DESCRIPTION OF THE DRAWING

FIG. 1 depicts a horizontally extending section through the left portion of a backrest of a seat unit of the invention.

DETAILED DESCRIPTION

Hereinafter, the subject of the invention will be explained by example more in detail.

The single figure illustrates a horizontally extending section through the left portion of a back-rest of a seat group structure.

The back-rest of a seat group structure illustrated in the figure in a horizontal section includes an inner shell part 1 made of a glass-mat reinforced thermoplastic plastic material laminate (GMT). According to the illustrated embodiment an upholster 14 is connected to this inner shell part 1, which can be for instance a foamed material. An outer covering 15 is arranged on this upholster 14. Depending from the design it can consist of a textile material, synthetic leather or true leather. This covering 15 extends along the back supporting area of the group structure and according to the illustration of the figure until over the lateral areas of the inner shell portion 1. Furthermore, an outer shell portion 2 is present. It includes also a covering 16 which may be for instance a textile product or also a part of a carpet, such as known among others for motor vehicles such as stations wagons. The covering 15 may, thereby (see left end area of the figure), extend over the inner shell part 1 up to the outer shell part 2. The inner shell part 1 includes holding fixtures 17 with recesses 18. The inner shell part 1 includes corresponding projections 19 by means of which it is set into the holding fixtures 17 of the outer shell part.

The inner shell part 1 is mounted to the outer shell part 2 by means of a form-locked snap-lock connection, whereby the snap-lock connections extend along both sides of the respective backrest of the seat and along the upper part and/or also along its lower part.

Basically it is now to be mentioned that the structural members which now will be described, can be designed as continuous ledges which extend along the edge areas of the inner shell part 1 and the outer shell part 2. Preferred, however, they are in form of partial ledge group sections arranged at lateral distances from each other, i.e. that a plurality of ledge sections forming discrete snap-lock locations are arranged along an edge area.

In order to form a respective snap-lock connection the inner shell part 1 includes an L-shaped portion 3 located at its outer edge area and extending in accordance with the extent of the snap-lock connection. This L-shaped portion 3 is formed by a first leg part 4 and a second, adjoining leg part 5 extending at least approximately perpendicularly thereto. The outer shell part 2 includes also a L-shaped portion 6, which is formed by a third leg part 7 and a fourth leg part 8 projecting therefrom. The third leg part 7 projects hereby as such from the plate like main portion 12 of the outer shell part 2. A first protrusion part 9 projects from the first leg part 4 of the L-shaped portion 3 at a location remote from the second leg part 5. This protrusion part 9 extends at least approximately parallel to the second leg part 5.

Furthermore, a second protrusion part 10 projects from the second leg part 5, which in turn is located by a distance remote from the first leg part 4. It can be seen that there two protrusion parts 9 and 10 are directed against each other and end at a distance from each other such that they define a L-shaped gap. The fourth leg part 8 and the directly adjacent third leg part 7 of the L-shaped section 6 of the outer shell part 2 are located in this L-shaped gap.

A weakening area 11 which can be formed by a succession of slots analogue to the ledge sections extends at the area of this gap, which slots extend according to the snap-lock connection, e.g. along both sides of the back rest of the seat and along its upper edge. It can, thus, be seen, that the second leg part 5 can be elasticity bent relative to the first leg part 4.

A plate shaped main portion 12 of the outer shell part 2 which is structured somewhat thinner projects from the third leg part 7 of the L-shaped section 6 and it can be seen that also the third leg part 7, i.e. the entire L-shaped position 6 can be resiliently bent relative to the plate shaped main portion 12 of the outer shell part 2. The vertical distance between the second protrusion part 10 of the second leg part 5 and the surface portion of the inner shell part 1 facing same is selected at the area of the weakening area 11 such that this distance equals the thickness of the fourth leg part 8 of the L-shaped section 6 located therebetween.

Furthermore, the vertical distance between the first protrusion part 9 and the second protrusion part 10, which protrusion parts 9 and 10 are directed against each other, is selected such that it is larger than the thickness of the portion of the third leg part 7 located in the area of this gap. It can been seen further that a curvilinear portion at the first leg part 4 is located between the surface portion of the first protrusion part 9 facing the fourth leg part 8 and the surface portion abutting the fourth leg part 8 at the region of the weakening area 11.

Because the second leg part 5 and the third leg part 7 as well are resiliently bendable, it can be seen that the third leg part 7 can be snapped into mentioned gap such that the inner shell part 1 is connected to the outer shell part 2.

Based on the above explained dimensions at the area of the gap and specifically of the fourth leg part 8, it is obvious that this fourth leg part 8 is held in a clamped manner between the second protrusion part 10 and the surface area of the first leg part 4, which rests on the leg part 8. Furthermore, the corresponding area of the second leg part 5 rests on the end surface 13 of the fourth leg part 8. Thus, a form locked snap-lock connection is formed between the inner shell part 1 and the outer shell part 2.

It can be further seen that in case of forces occurring e.g. due to an accident acting onto the area of the snap-lock connection can not cause a separation of the two shell parts 1, 2. Any force, independent from the line of its action is directly transferred from one respective shell part onto the other shell part, wherewith a detaching of the snap-lock connection is impossible.

I claim:

1. A double shell support structure for a backrest of a seat unit, which supporting structure is made of a plastic material and includes:

an inner shell part designed as backrest for a person sitting on the seat unit, an outer shell part designed as stiffening member for the inner shell part, which outer shell part is clampingly connected to the inner shell part by means of a form-locked snap-lock connection, in which said inner shell part comprises an L-shaped portion having a first leg and a second leg located adjacent said first leg and extending at least approximately perpendicularly thereto, which L-shaped portion forms a part of the form-locked snap-lock connection;

said outer shell part comprises a plate shaped main portion including a further L-shaped portion having a third leg and a fourth leg located adjacent said third leg and extending at least approximately perpendicularly thereto;

said first leg of the inner shell part comprises at a location remote from the second leg of the inner shell part a first protrusion extending at least approximately parallel to said second leg;

said second leg of the inner shell part comprises at a location remote from the first leg a second protrusion extending at least approximately parallel to the first leg;

which protrusions are directed against each other and end at a distance from each other defining an L-shaped gap;

and whereby said fourth leg and a directly adjoining portion of said third leg of the outer shell part are located in said L-shaped gap.

2. The double shell supporting structure of claim 1, in which said first L-shaped portion of the inner shell part comprises a weakening area extending along the area of said gap, so that said second leg is resiliently bendable relative to said first leg;

and said third leg is elongated and projects from the plate shaped main portion of the outer shell part, so that the third leg is resiliently bendable relative to the plate shaped main portion.

3. The double shell supporting structure of claim 2, in which said fourth leg is of a predetermined thickness which is equal to the vertical distance between the surface area of the second protrusion and the surface area of the L-shaped portion of the inner shell part at the area of the weakening area thereof, which surface areas face each other;

and said third leg is at least at the area of the gap between the first protrusion and the second protrusion of a predetermined thickness which is smaller than the vertical distance between the first protrusion and the second protrusion.

4. The double shell supporting structure of claim 3 in which said inner shell part comprises at a location between its surface area facing the fourth leg and the surface area of the first protrusion facing the fourth leg a curvilinear extending surface portion for facilitating the inserting of the fourth leg into the gap when assembling the support structure.

5. The double shell supporting structure of claim 4 in which the L-shaped portion of the outer shell part and the second leg are pretensioned against each other, whereby the second leg rests on an end surface of the fourth leg.

6. The double shell support structure of claim 5 in which said fourth leg is held clamped between the surface area of the second protrusion and the surface area of the L-shaped portion of the inner shell part which face each other.

7. The double shell supporting structure of claim 6 in which said weakening area is formed by a succession of slots extending parallel to the first protrusion at the area of the gap in the first leg.

8. The double shell supporting structure of claim 1 in which said inner shell part and said outer shell part consist of a glass-mat reinforced thermoplastic material laminate.

* * * * *

UNITED STATES PATENT AND TRADEMARK OFFICE
CERTIFICATE OF CORRECTION

PATENT NO. : 5,681,093
DATED : October 28, 1997
INVENTOR(S) : Pfister

It is certified that error appears in the above-identified patent and that said Letters Patent is hereby corrected as shown below:

Column 1, line 60, "art" should be --part--.

Column 1, line 66, "arts" should be --parts--.

Column 3, line 24, "been" should be --be--.

Signed and Sealed this

Twenty-third Day of June, 1998

*Attest:*

BRUCE LEHMAN

*Attesting Officer*  *Commissioner of Patents and Trademarks*